United States Patent
Rawat et al.

(10) Patent No.: US 8,442,556 B2
(45) Date of Patent: May 14, 2013

(54) DETECTING MOBILE DEVICE USAGE WITHIN WIRELESS NETWORKS

(75) Inventors: Vikram K. Rawat, San Ramon, CA (US); Derek Hongwei H. Bao, Concord, CA (US); Patricia Ruey-Jane Chang, San Ramon, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 84 days.

(21) Appl. No.: 12/966,321

(22) Filed: Dec. 13, 2010

(65) Prior Publication Data

US 2012/0149387 A1    Jun. 14, 2012

(51) Int. Cl.
*H04W 24/00* (2009.01)

(52) U.S. Cl.
USPC ............ 455/456.2; 455/456.1; 455/457; 455/67.11; 340/539.13

(58) Field of Classification Search ........... 455/67.11, 455/67.13, 456.1–456.6
See application file for complete search history.

(56) References Cited

U.S. PATENT DOCUMENTS

| | | | |
|---|---|---|---|
| 5,400,254 A * | 3/1995 | Fujita | 701/468 |
| 6,374,179 B1 * | 4/2002 | Smith et al. | 701/517 |
| 6,389,284 B1 * | 5/2002 | Cook et al. | 455/434 |
| 6,418,467 B1 * | 7/2002 | Schweitzer et al. | 709/223 |
| 6,516,189 B1 * | 2/2003 | Frangione et al. | 455/405 |
| 6,745,011 B1 * | 6/2004 | Hendrickson et al. | 455/67.11 |
| 7,031,694 B2 * | 4/2006 | Koulakiotis et al. | 455/406 |
| 2002/0069404 A1 * | 6/2002 | Copeman et al. | 725/32 |
| 2004/0033808 A1 * | 2/2004 | Rorabaugh | 455/456.1 |
| 2004/0192269 A1 * | 9/2004 | Hill | 455/414.1 |
| 2005/0101245 A1 * | 5/2005 | Ahmavaara | 455/1 |
| 2006/0100782 A1 * | 5/2006 | Levi et al. | 701/217 |
| 2009/0082040 A1 * | 3/2009 | Kahn | 455/457 |
| 2009/0280832 A1 * | 11/2009 | Karaoguz et al. | 455/456.2 |
| 2010/0015926 A1 * | 1/2010 | Luff | 455/67.13 |
| 2010/0290424 A1 * | 11/2010 | Collingrige | 370/329 |
| 2011/0163874 A1 * | 7/2011 | van OS | 340/539.13 |
| 2012/0021776 A1 * | 1/2012 | Phillips | 455/456.3 |
| 2012/0072311 A1 * | 3/2012 | Khan | 705/26.81 |

* cited by examiner

*Primary Examiner* — Charles Shedrick

(57) ABSTRACT

A device sends, to a mobile device, instructions to collect location-based data associated with calls conducted by the mobile device over a wireless access network and receives, from the mobile device, the location-based data, where the location-based data includes a three-dimensional location and a time associated with each of multiple calls conducted by the mobile device over the wireless access network. The device combines the location-based data with other location-based data from other mobile devices and identifies, based on the combined location-based data and other location-based data, a localized area of congestion for the wireless access network.

19 Claims, 14 Drawing Sheets

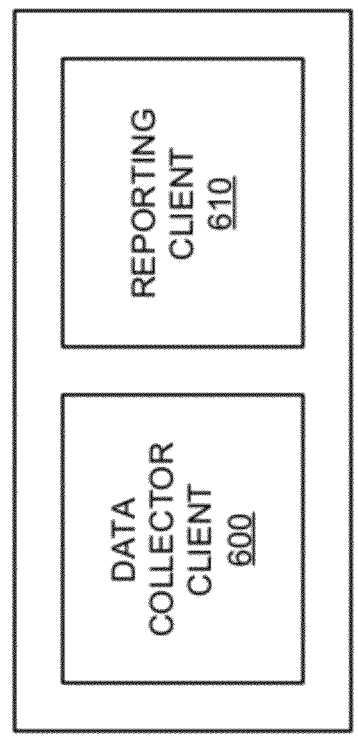

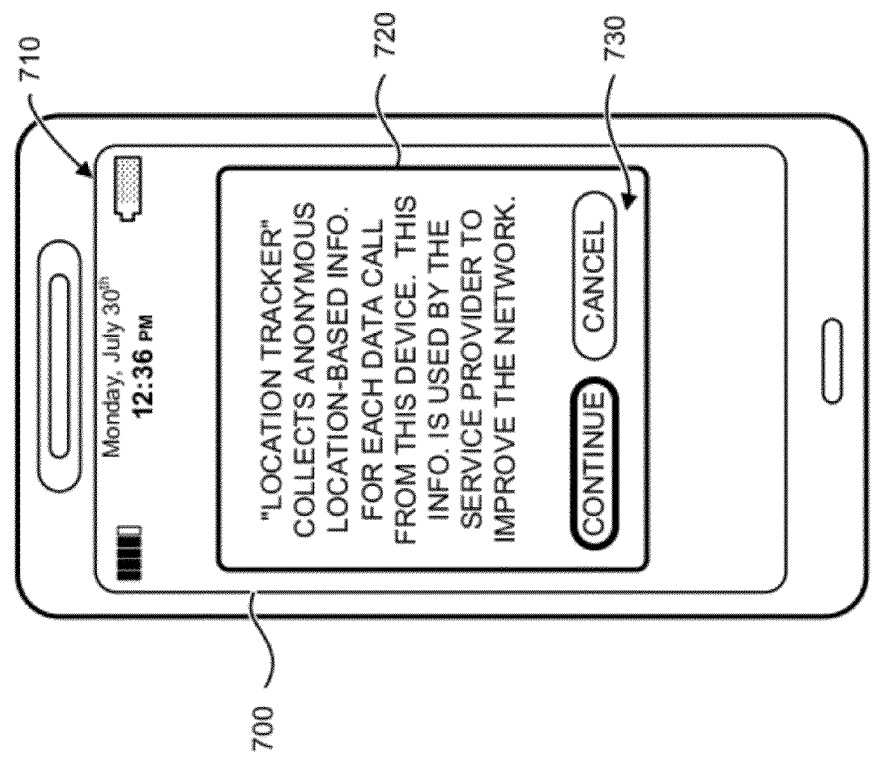

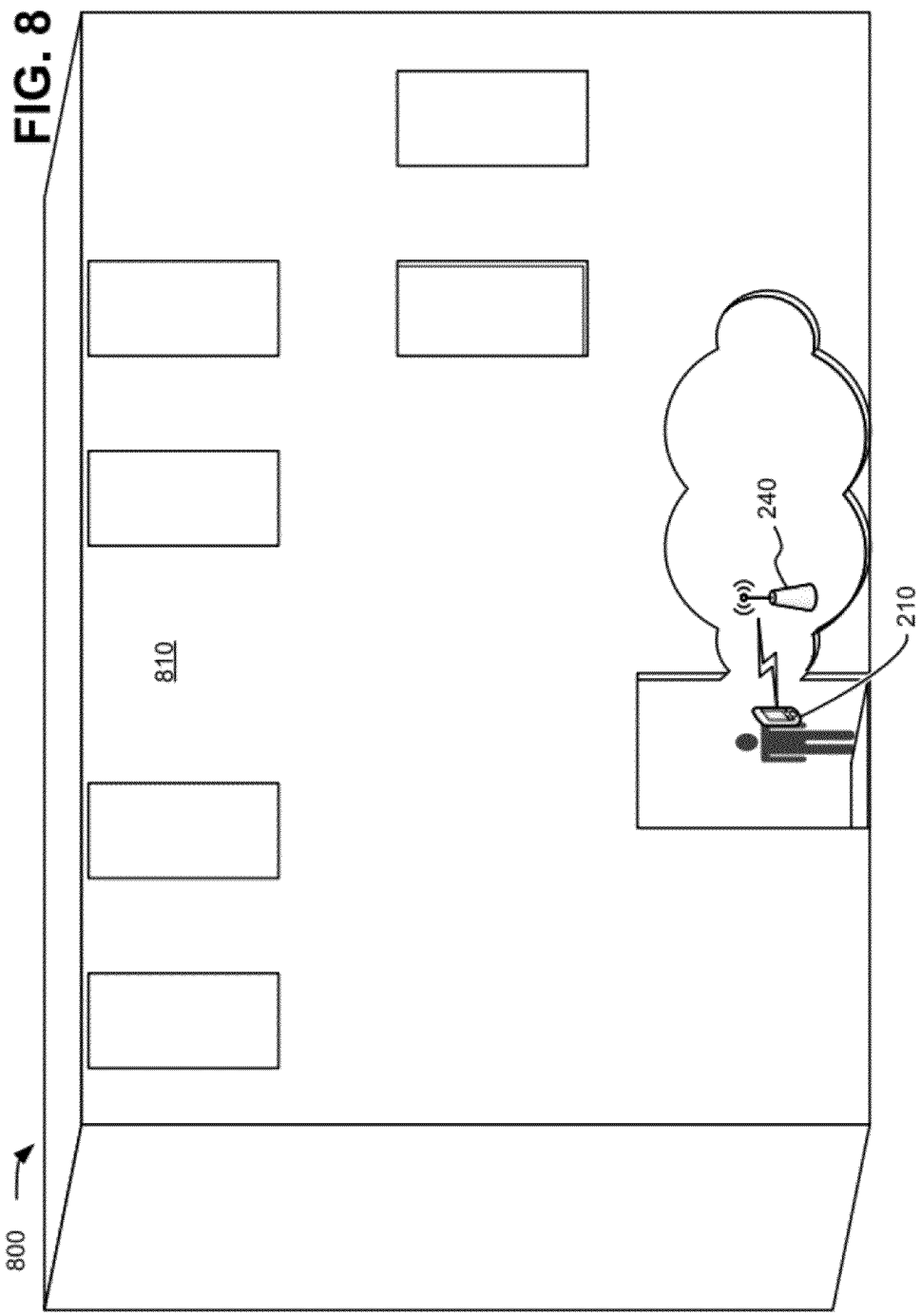

DETECTING MOBILE DEVICE USAGE WITHIN WIRELESS NETWORKS

BACKGROUND

As wireless network data rates improve using third generation (3G), fourth generation (4G), and WiFi technologies, users are using wireless networks for more and more bandwidth-intensive applications. While offering improvements over earlier generations of wireless networks, available bandwidth for today's wireless networks is not unlimited. Particularly, the available radio frequency (RF) spectrum for wireless access networks may be exhausted during peak use periods in major metropolitan areas. For example, transfer of bandwidth-intensive content (such as video and multimedia content) by multiple mobile devices (e.g., a mobile communication device, a laptop computer, etc.) within the same area (e.g., served by the same base station) may cause users to experience degraded performance.

A wireless network may include traditional wireless communication stations (macro cell base stations) installed at fixed locations and used to communicate with the mobile devices. Various options are available to wireless service providers to mitigate bandwidth limitations, but many of these options require knowledge of localized congestion areas within a particular cell. However, pinpointing a specific area of high bandwidth use within a crowded metropolitan environment (e.g., including adjacent, high-rise buildings) remains a challenge.

BRIEF DESCRIPTION OF THE DRAWINGS

FIG. 6 is a diagram of example functional components of the mobile device of FIG. 2;

FIGS. 7A and 7B depict an example of a user interface including a notice of location data monitoring;

FIG. 8 is a diagram of an example location registration setting for a mobile device of FIG. 2;

DETAILED DESCRIPTION OF PREFERRED EMBODIMENTS

The following detailed description refers to the accompanying drawings. The same reference numbers in different drawings may identify the same or similar elements.

Figure 1:
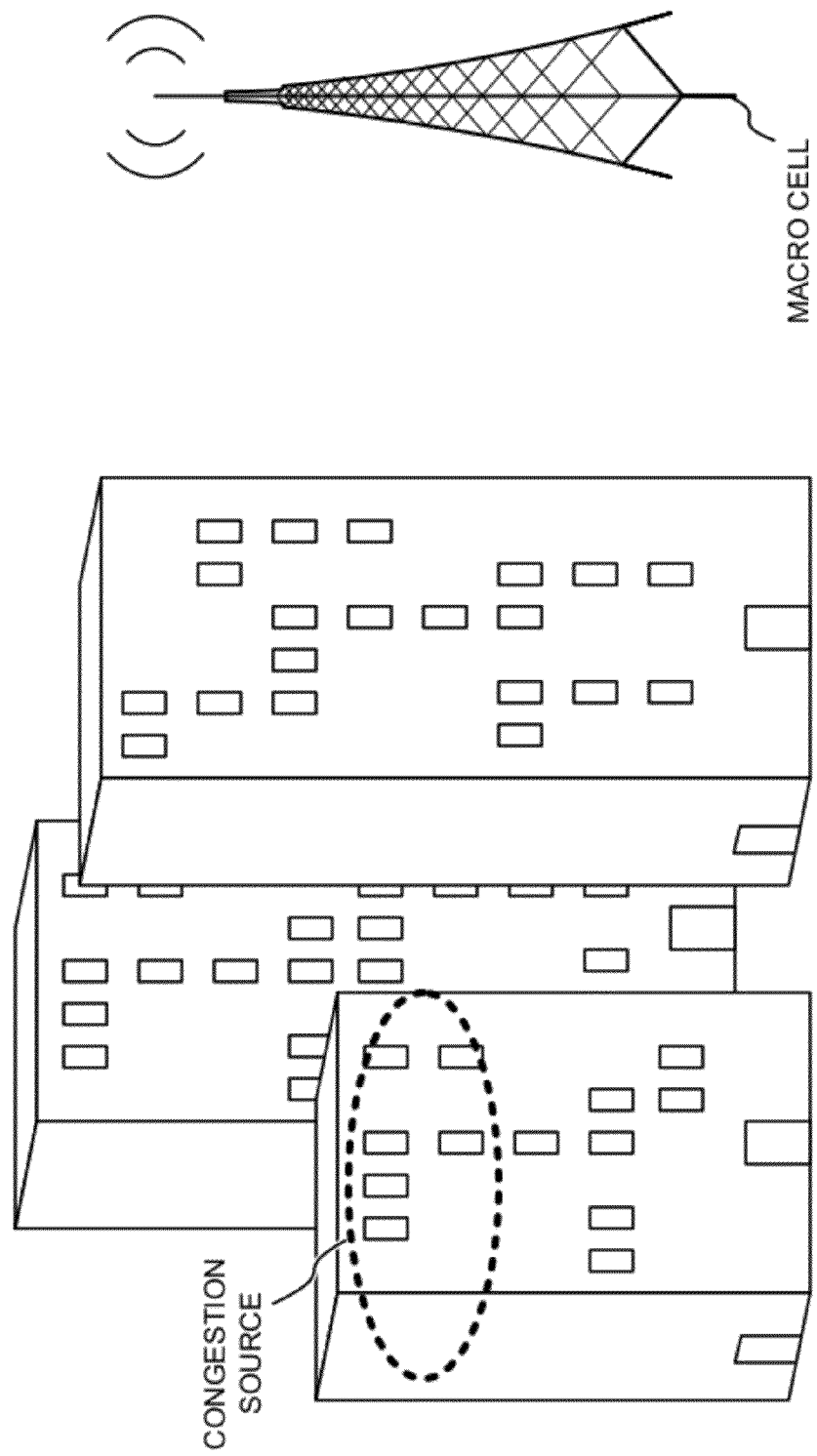
FIG. 1 is a diagram illustrating concepts described herein.

Systems and/or methods described herein may collect information to detect areas of high network traffic in three-dimensional space within a wireless network cell. Major metropolitan areas may have a high number of mobile device users that may exhaust the available RF spectrum for a wireless access network. As shown in FIG. 1, particular areas, such as certain floors of an office building, may be sources of congestion (e.g., for a macro cell generated by a base station) that, if mitigated, may resolve bandwidth issues for the entire cell. The systems and/or methods described herein may collect location and time data related to calls from mobile devices. The systems and/or methods may compile the location/time data from a statistically significant sample size to determine a particular source of congestion so that capacity mitigation efforts may be effectively targeted within the cell.

In one example implementation, the systems and/or methods described herein may receive instructions to collect location-based data associated with calls (e.g., voice, short message service (SMS), data calls, etc.) conducted by a mobile device over a wireless access network. The systems and/or methods may collect location-based data associated with a particular call conducted by the mobile device over the wireless access network, where the location-based data includes a three-dimensional location and a time of the call. The systems and/or methods may store, in a local memory, the location-based data associated with the particular call and may send, to a data server, the location-based data associated with the particular call. The data server may receive the location-based data and may combine the location-based data with other location-based data from other mobile devices. The data server may identify, based on the combined data, a localized area of congestion for the wireless access network.

As used herein, the terms "subscriber" and/or "user" may be used interchangeably. Also, the terms "subscriber" and/or "user" are intended to be broadly interpreted to include a mobile device (e.g., a mobile telephone) or a user of a mobile device.

Figure 2:
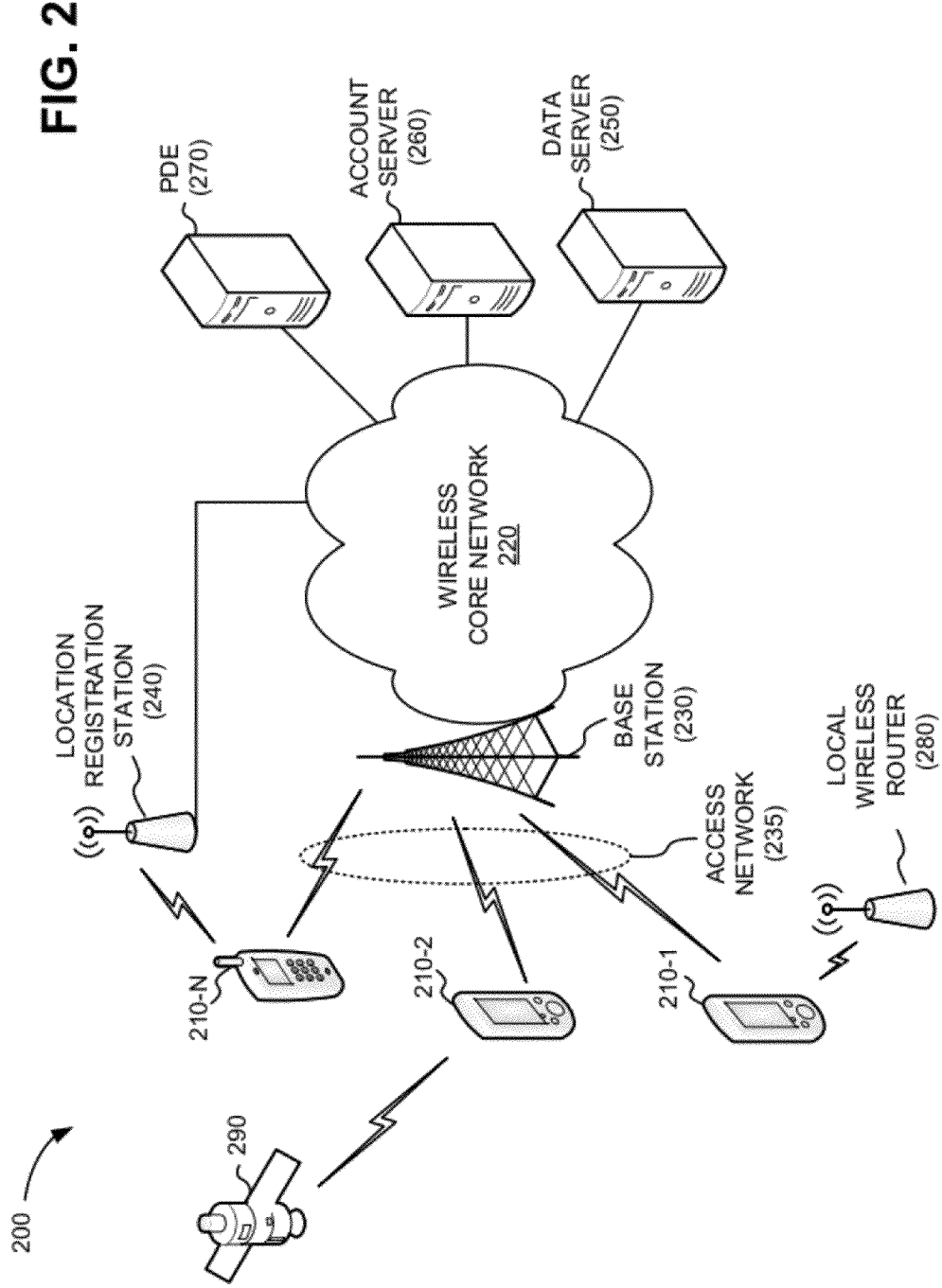
FIG. 2 is a diagram of an example network in which systems and/or methods described herein may be implemented.

FIG. 2 is a diagram of an example network 200 in which systems and/or methods described herein may be implemented. As illustrated, network 200 may include multiple mobile devices 210-1, 210-2, . . . , 210-N (referred to herein collectively as "mobile devices 210" or generically as "mobile device 210"); a wireless core network 220; a base station 230; a location registration station 240; a data server 250; an account server 260; a position determining entity (PDE) 270; a local wireless router 280; and a satellite 290. Components of network 200 may interconnect via wired and/or or wireless connections. Three mobile devices 210, one wireless core network 220, one base station 230, one registration station 240, one data server 250, one account server 260, one PDE 270, one local wireless router 280, and one satellite 290 have been illustrated in FIG. 2 for simplicity. In practice, there may be more mobile devices 210, wireless core networks 220, base stations 230, registration stations 240, data servers 250, account servers 260, PDEs 270, local wireless routers 280, and/or satellites 290.

Mobile device 210 may include a device capable of transmitting and receiving data (e.g., voice, text, images, and/or multimedia data) over wireless core network 220. For example, mobile device 210 may be a self-contained data device, such as a mobile telephone, a smart phone, an electronic notepad, a personal digital assistant (PDA), a personal communications system (PCS) terminal, a global positioning system (GPS) device, etc. In another implementation, mobile device 210 may be connected to a computing device, such as tablet, laptop or personal computer. In one implementation, mobile devices 210 may establish wireless communication sessions with base stations 230 or registration stations 240 using identical protocols. The wireless communication sessions may be used for voice (e.g., telephone calls) or data sessions. In implementations described herein, mobile device 120 may collect per-call location, elevation, and/or time data related to a call; may store the collected data; and may send the collected data to data server 250 associated with a wireless network provider. In one implementation, mobile device 210 may also include a device that is capable of communicating with local wireless router 280 using a local wireless network, such as a WiFi network.

Wireless core network 220 may include components to implement the core network of the Evolution-Data Optimized (EV-DO) standard. One implementation of such a core network may include the Evolved Packet Core (EPC) architecture. In other implementations, other network technologies, such as Second generation ("2G"), third generation ("3G"), and fourth generation ("4G"), and future generation standards under the International Mobile Telecommunications program, may be implemented instead of or in addition to the EV-DO standard. Components within wireless core network 220 may generally be connected over wired or wireless Internet protocol (IP)-based connections.

Base station 230 may represent a base station designed to provide wireless communication service to a relatively large area and simultaneously serve a relatively large number of mobile devices 210. Base station 230 may also be referred to herein as a "macro cell base station." In one example, base station 230 may provide a wireless access network (e.g., access network 235) for mobile devices 210. Access network 235, in one implementation, may correspond to a 3G network, 4G network, a Long Term Evolution (LTE) network, an advanced LTE network, etc. Access network 235 may include a communications network that connects subscribers (e.g., mobile devices 210) to service providers (e.g., via wireless core network 220). In another implementation, access network 235 may include an extended WiFi network (e.g., IEEE 802.11n) or another access network (e.g., a High-Speed Packet Access (HSPA) network, an enhanced high-rate packet data (eHRPD) network, or a WiMax network).

Location registration station 240 may include one or more computation and/or communication devices that receive signals from mobile devices 210 when mobile devices 210 are within a vicinity (e.g., several inches up to several yards) of location registration station 240. In one implementation, location registration station 240 may include a femtocell, a picocell, a microcell, or a radio frequency identification (RFID) scanner. In implementations described herein, location registration station 240 may collect location data from authorized mobile devices 210 to detect, for example, when mobile devices 210 enter/exit a particular building (e.g., a building where location registration station 240 is located).

Data server 250 may include one or more server devices, or other types of computation or communication devices, that gather, process, search, and/or provide information in a manner described herein. In one implementation, data server 250 may distribute, to participating mobile devices 210, location data collection software that may be used to manage location, elevation, and/or time data for each call made from the participating mobile device 210. Data server 250 may receive authorization, from a user of a mobile device 210, may receive and compile call data from each mobile device, and may analyze the combined call data to identify sources of traffic congestion on, for example, access network 235.

Account server 260 may include one or more server devices, or other types of computation or communication devices, that gather, process, search, and/or provide information in a manner described herein. In one implementation, account server 260 may receive and store account information associated with mobile devices 210. In another implementation, account server 260 may monitor participation of mobile devices 210 in voluntary location data collection projects and provide account incentives, credits, etc., to promote user participation.

PDE 270 may include one or more computation or communication devices that gather, process, search, and/or provide information in a manner described herein. For example, PDE 270 may include one or more components to determine the position of mobile device 210 and/or to help mobile device 210 determine its own position. PDE 270 may, for example, track positions of GPS satellites (e.g., satellite 290) through a network of stationary GPS receivers distributed across the coverage area of a wireless network. PDE 270 may determine an approximate location of mobile device 210 based on the signal from a local base station 230 and provide mobile device 210 with the identities and positions of GPS satellite(s) 290 that are likely to be in range of mobile device 210. PDE 270 may support one or more position determining technologies or algorithms to gather location information.

Local wireless router 280 may include a device that may provide connectivity between equipment (e.g., mobile devices 210) within, for example, customer premises and between the customer premises equipment and an external network (not shown). In one implementation, local wireless router 280 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., WiFi). In other implementations, different short-range wireless protocols and/or frequencies may be used. Local wireless router 280 may also include one or more wired (e.g., Ethernet) connections. In one implementation, local wireless router 280 may utilize a unique service set identifier (SSID) that identifies a particular wireless LAN.

Satellite 290 may include a GPS satellite that provides location information. For example, mobile device 210 may send a signal to satellite 290 to request position information, and satellite 290 may respond to the signal by providing latitude and longitude coordinates indicating the position of mobile device 210.

Although FIG. 2 shows example components of network 200, in other implementations, network 200 may include fewer components, different components, differently arranged components, and/or additional components than those depicted in FIG. 2. Alternatively, or additionally, one or more components of network 200 may perform one or more other tasks described as being performed by one or more other components of network 200.

Figure 3:
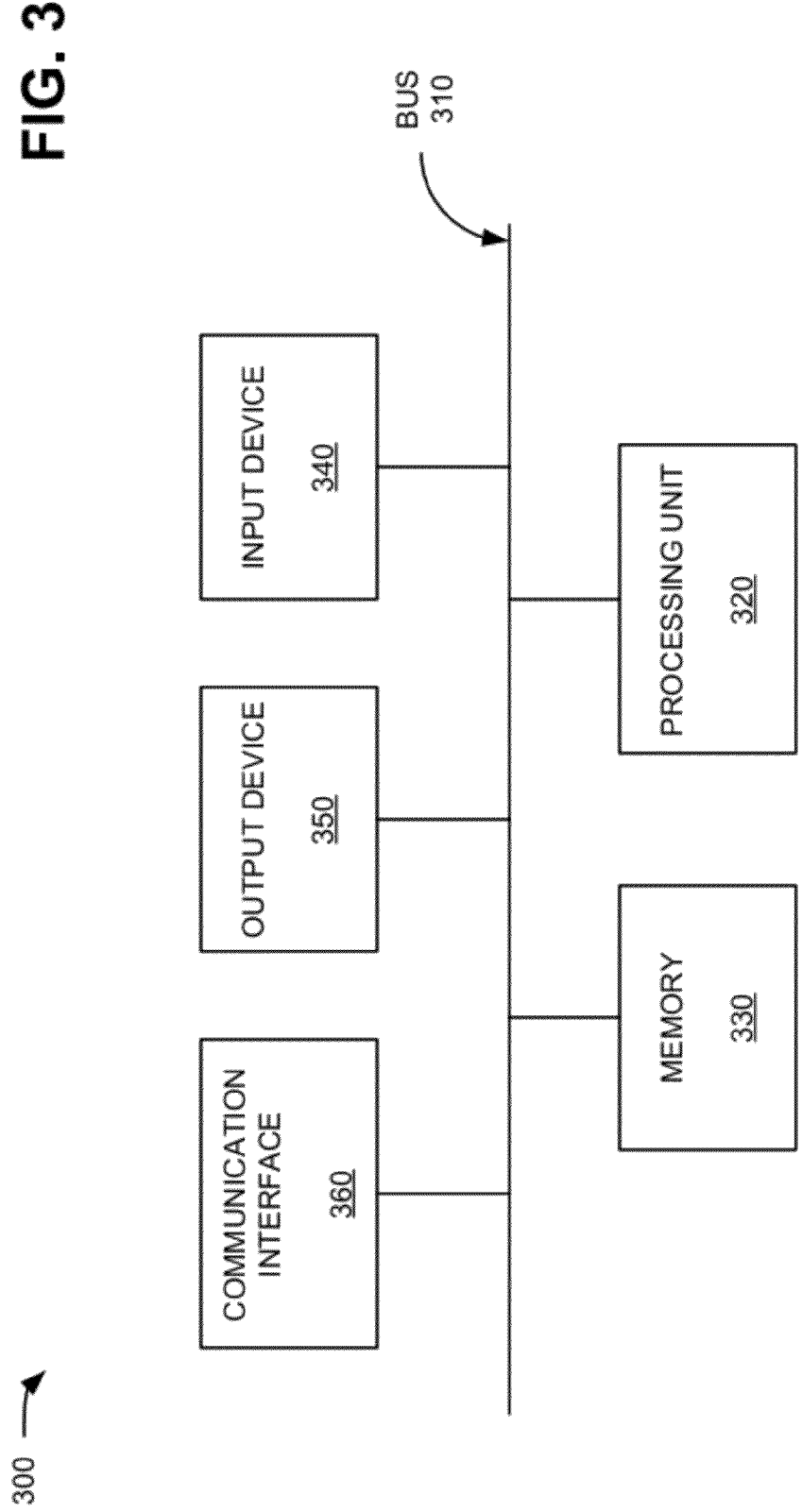
FIG. 3 is a diagram of example components of a base station, a data server, an account server, or a position determining entity of FIG. 2.

FIG. 3 is a diagram of example components of a device 300 that may correspond to one of base station 230, data server 250, account server 260, or PDE 270. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
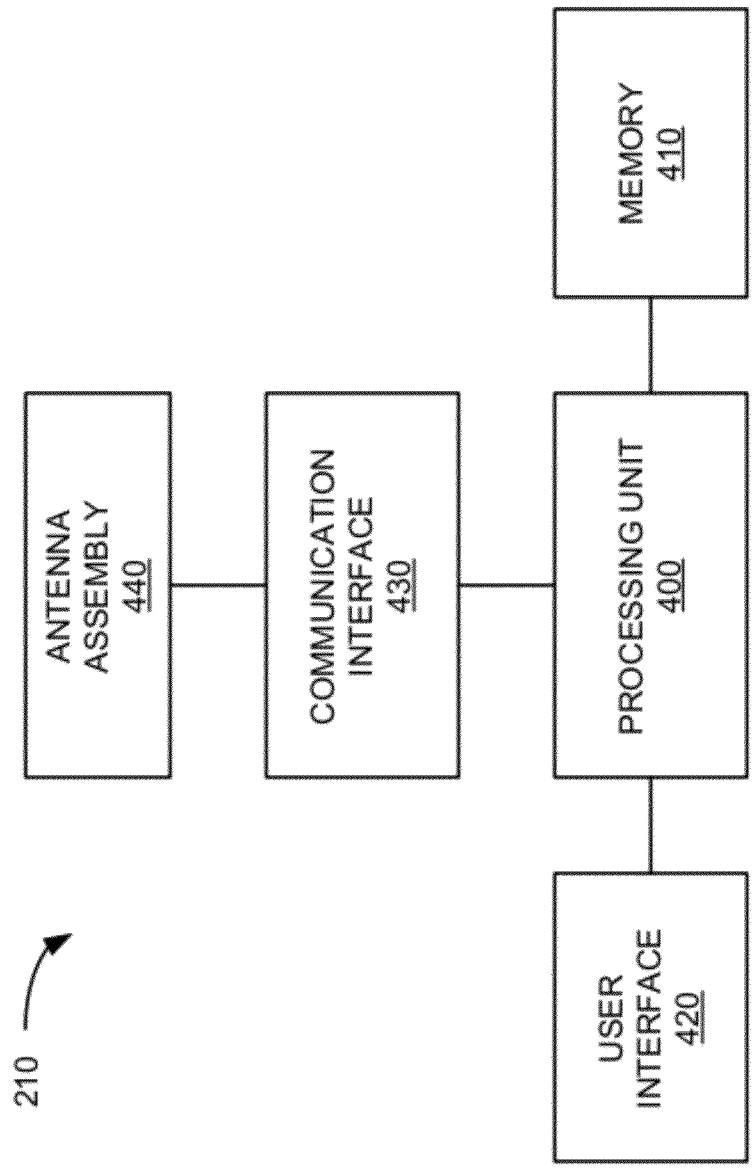
FIG. 4 is a diagram of example components of a mobile device depicted in FIG. 2.

FIG. 4 is a diagram of example components of mobile device 210. As illustrated, mobile device 210 may include a processing unit 400, a memory 410, a user interface 420, a communication interface 430, and/or an antenna assembly 440.

Processing unit 400 may include one or more processors, microprocessors, ASICs, FPGAs, or the like. Processing unit 400 may control operation of mobile device 210 and its components. In one implementation, processing unit 400 may control operation of components of mobile device 210 in a manner described herein.

Memory 410 may include a RAM, a ROM, and/or another type of memory to store data and instructions that may be used by processing unit 400.

User interface 420 may include mechanisms for inputting information to mobile device 210 and/or for outputting information from mobile device 210. Examples of input and output mechanisms might include buttons (e.g., control buttons, keys of a keypad, a joystick, etc.) or a touch screen interface to permit data and control commands to be input into mobile device 210; a speaker to receive electrical signals and output audio signals; a microphone to receive audio signals and output electrical signals; and/or a display to output visual information (e.g., text input into mobile device 210).

Communication interface 430 may include, for example, a transmitter that may convert baseband signals from processing unit 400 to RF signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate, via antenna assembly 440, with a network and/or devices connected to a network (e.g., access network 235).

As will be described in detail below, mobile device 210 may perform certain operations in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of mobile device 210, in other implementations, mobile device 210 may contain fewer components, different components, differently arranged components, or additional components than depicted in FIG. 4. I Alternatively, or additionally, one or more components of mobile device 210 may perform one or more other tasks described as being performed by one or more other components of mobile device 210.

Figure 5:
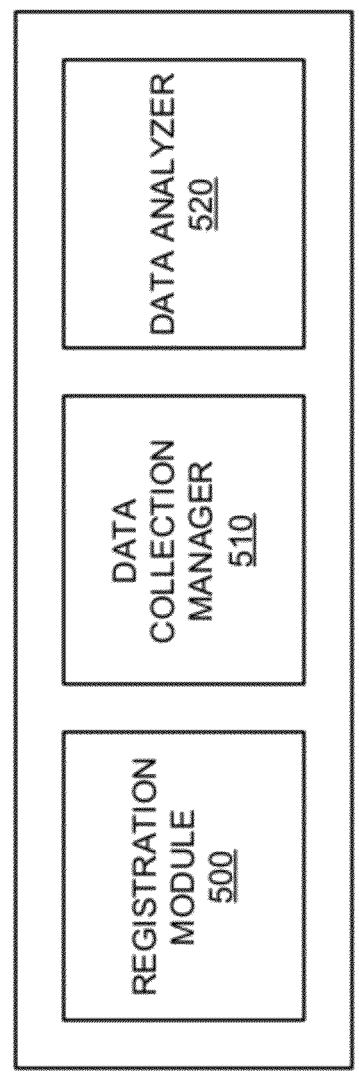
FIG. 5 is a diagram of example functional components of the data server of FIG. 2.

FIG. 5 is a diagram of example functional components of data server 250. In one implementation, the functions described in connection with FIG. 5 may be performed by one or more components of device 300 (FIG. 3). As shown in FIG. 5, data server 250 may include a registration module 500, a data collection manager 510, and a data analyzer 520.

Registration module 500 may include hardware or a combination of hardware and software to provide an application (e.g., software) to mobile devices 210 to enable participation in location data collection projects. For example, registration module 500 may receive a request from mobile device 210 for a data collection application. In one implementation, the request for the data collection application may be in response to a targeted advertisement or other notification (e.g., including a link to data sever 250). In one implementation, registration module 500 may also include an authorization component to obtain a user's permission, verify a user's age (e.g., as not a minor), etc., before enabling the data collection application.

Data collection manager 510 may include hardware or a combination of hardware and software to provide data collection and transmission instructions to mobile devices 210 and to receive requested data from mobile devices 210. For example, data collection manager 510 may direct mobile devices 210 to collect data at certain periods (e.g., only during peak periods, all periods, only when connected to a particular base station 230, etc.). Data collection manager 510 may also provide instructions to mobile devices 210 to store and forward collected location data. For example, data collection manager 510 may instruct participating mobile devices 210 to provide data dumps (e.g., of collected location information from each call by mobile device 210) at configurable intervals (e.g., once a day, every few hours, during a particular time window, etc.). As another example, data collection manager 510 may send a ping (e.g., a multicast ping) to mobile devices 210 to request location data on demand. As a further example, data collection manager 510 may instruct mobile device 210 to provide per-call location data whenever a certain data size or percentage of memory capacity (e.g., associated with mobile device 210) is reached. In still a further example, data collection manager 510 may instruct that mobile devices provide location data after each call.

Data analyzer 520 may include hardware or a combination of hardware and software to compile location, elevation, and time data from mobile devices 210 and generate a time-based geographic representation of network traffic, based on the compiled data. In one implementation, data analyzer 520 may convert location data from mobile devices 210 into a common format. For example, GPS coordinates, physical addresses, and/or other location indicators may be converted into latitude and longitude coordinates with elevation. For example, data analyzer 520 may identify (or be provided with) a particular congested time associated with base station 230. Data analyzer 520 may plot location and elevation data for calls during that particular time to determine if a localized source of the congestion exists. In one implementation, the localized source of congestion may be identified within a set of three dimensional boundaries, including an upper and a lower elevation (e.g., corresponding to particular floors of a high-rise building).

Although FIG. 5 shows example functional components of data server 250, in other implementations, data server 250 may include fewer functional components, different functional components, differently arranged functional components, and/or additional functional components than depicted in FIG. 5. Alternatively, or additionally, one or more functional components of data server 250 may perform one or more other tasks described as being performed by one or more other functional components of data server 250.

FIG. 6 is a diagram of example functional components of mobile device 210. In one implementation, the functions described in connection with FIG. 6 may be performed by one or more components of device 400 (FIG. 4). As shown in FIG. 6, mobile device 210 may include a data collector client 600 and a reporting client 610. In one implementation, data collector client 600 and reporting client 610 may be included within a data collection application provided to mobile device 210 from data server 250.

Data collector client 600 may include hardware or a combination of hardware and software to collect location, elevation, and time data associated with calls made from mobile device 210. In one implementation, data collector client 600 may include an authorization interface to allow a user of mobile device 210 to expressly opt in to the location data collection service.

Figure 7B:
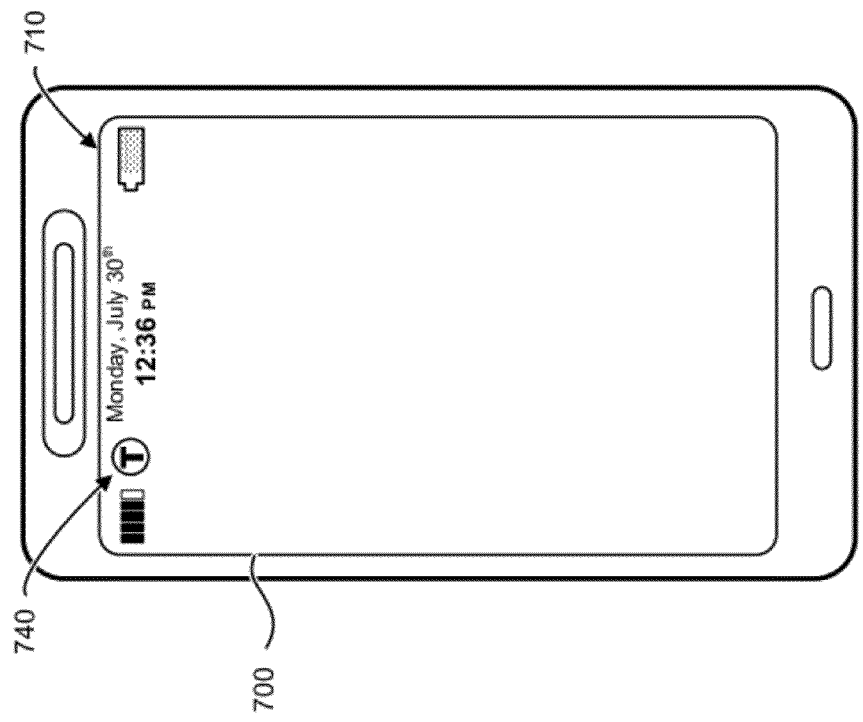

An example of a user interface including an authorization interface is shown in FIGS. 7A and 7B. As shown in FIG. 7A, mobile device 210 may include a display 700 that includes a user interface 710. User interface 710 may present status information regarding mobile device 210, such as signal strength, battery life, date/time, and/or network connectivity. In an implementation described herein, user interface 710 may include information generated by data collector client 600. For example, data collector client 600 may present a notice 720 to inform a user of mobile device 210 that an application will collect location data associated with calls from mobile device 210. As shown in FIG. 7A, notice 720 may include a name of an application associated with a request and the general nature of information associated with the request (e.g., "'Location Tracker' collects anonymous location-based information for each call from this device. This information is used by the service provider to improve the network."). In one implementation, notice 720 may also include control buttons 730 to allow a user to permit (e.g., "continue") or stop (e.g., "cancel") use of the location tracking program.

Assuming a user selects the "continue" control button 730 to permit use of the location tracking program, mobile device 210 may collect location for future calls from mobile device 210. In one implementation, as shown in FIG. 7B, user interface 710 may display a tracking indicator 740 to show to a user that mobile device 210 is in a location tracking mode. For example, tracking indicator 740 may be presented (e.g., by data collector client 600) in the form of a distinct visual icon.

Returning to FIG. 6, data collector client 600 may track location, elevation, and time information related to each call initiated by mobile device 210. Location data collected by data collector client 600 may depend, in part, on the functions/capabilities supported by mobile device 210.

In some implementations, location information may include, for example, GPS information or another form of global navigation satellite system (GNSS) information. In an example implementation, data collector client 600 may rely only on GPS satellite 290 to determine a location of mobile device 210. In another example implementation, PDE 270 may assist mobile device 210 in determining its GPS coordinates by providing ephemeris data to mobile device 210 to allow faster identification of satellites within view of mobile device 210. For example, at the time of each call, data collector client 600 may communicate with a location-based service infrastructure (e.g., PDE 270) within or via wireless core network 220 and GPS satellite 290 to determine a geographical location of mobile device 210. Additionally, or alternatively, data collector client 600 may retrieve location information in the form of cellular tower triangulation information collected from mobile device 210.

In still other implementations, data collector client 600 may obtain location information in the form of a fixed address or location associated with a wired network connection or IP address. For example, data collector client 600 may report, as location data, a service set identifier (SSID) (e.g., associated with local wireless router 280) to which mobile device 210 may be connected. In another implementation, data collector client 600 may report multiple SSIDs (or other network identifiers) for multiple wireless (e.g., WiFi) networks within range of mobile device 210 at the time a call (e.g., using access network 235) is placed. A service provider may, for example, conduct a survey of physical locations (e.g., physical addresses that may be converted into latitude and longitude coordinates with elevation) associated with SSIDs to approximate a location of a mobile device 210 that is within range of a wireless network. In another implementation, mobile device 210 or a data server (e.g., data server 250) may triangulate among the multiple SSIDs to determine a physical location (e.g., based on the known physical locations associated with each SSID).

In another implementation, data collector client 600 may extract elevation data from an altimeter included within mobile device 210. Elevation data may be combined, for example, with a physical address, GPS coordinates, or a building registration to provide three dimensional location data.

In another implementation, data collector client 600 may register with a monitoring device when a user enters/exits a particular building. FIG. 8 is a diagram of an example location registration setting 800 for mobile device 210. As shown in FIG. 8, a user may enter/exit a building 810. Building 810 may include location registration station 240 near, for example, an entrance to building 810, such that mobile device 210 carried by the user may communicate with location registration station 240. In an example implementation, mobile device 210 may include a RFID tag, and location registration station 240 may perform a RFID scan of mobile device 210 to detect when a user enters and exits building 810. In another implementation, location registration station 240 may include a femtocell to register mobile device 210 as the user enters building 810. In one implementation, location registration station 240 may report the results of the RFID scan or the femtocell registration to, for example, data server 250 (e.g., data collection manager 510) so that the building location may be associated with time and/or elevation information later provided by mobile device 210 (from a call while the user is in building 810). In another implementation, location registration station 240 may report a count (e.g., a statistically significant sample) of mobile devices 210 within building 810 so that a service provider may infer high usage in building 810 based on the count.

Retuning to FIG. 6, data collector client 600 may include a time stamp with location information for each call of mobile device 210. In one implementation, the time stamp may include a time stamp based on a network clock. Data collector client 600 may assemble the location, elevation, and/or time information associated with each call in a memory (e.g., memory 410) of mobile device 210, along with information from other calls, to provide to data server 250.

Reporting client 610 may include hardware or a combination of hardware and software to provide location tracking information from mobile device 210 to data server 250. In one implementation, reporting client 610 may provide the location tracking information based on instructions from data collection manager 510. For example, reporting client 610 may be instructed to provide data dumps (e.g., of collected location tracking information) at configurable intervals (e.g., once a day, every few hours, during a particular time window, etc.), upon request from data server 250, whenever a certain data size or percentage of memory capacity (e.g., associated with mobile device 210) is reached, or after each call.

Although FIG. 6 shows example functional components of mobile device 210, in other implementations, mobile device 210 may include fewer functional components, different functional components, differently arranged functional components, or additional functional components than depicted in FIG. 6. Alternatively, or additionally, one or more functional components of mobile device 210 may perform one or more other tasks described as being performed by one or more other functional components of mobile device 210. Furthermore, the example user interface presented in connection with FIGS. 7A and 7B may include different and/or differently arranged information.

Figure 9:
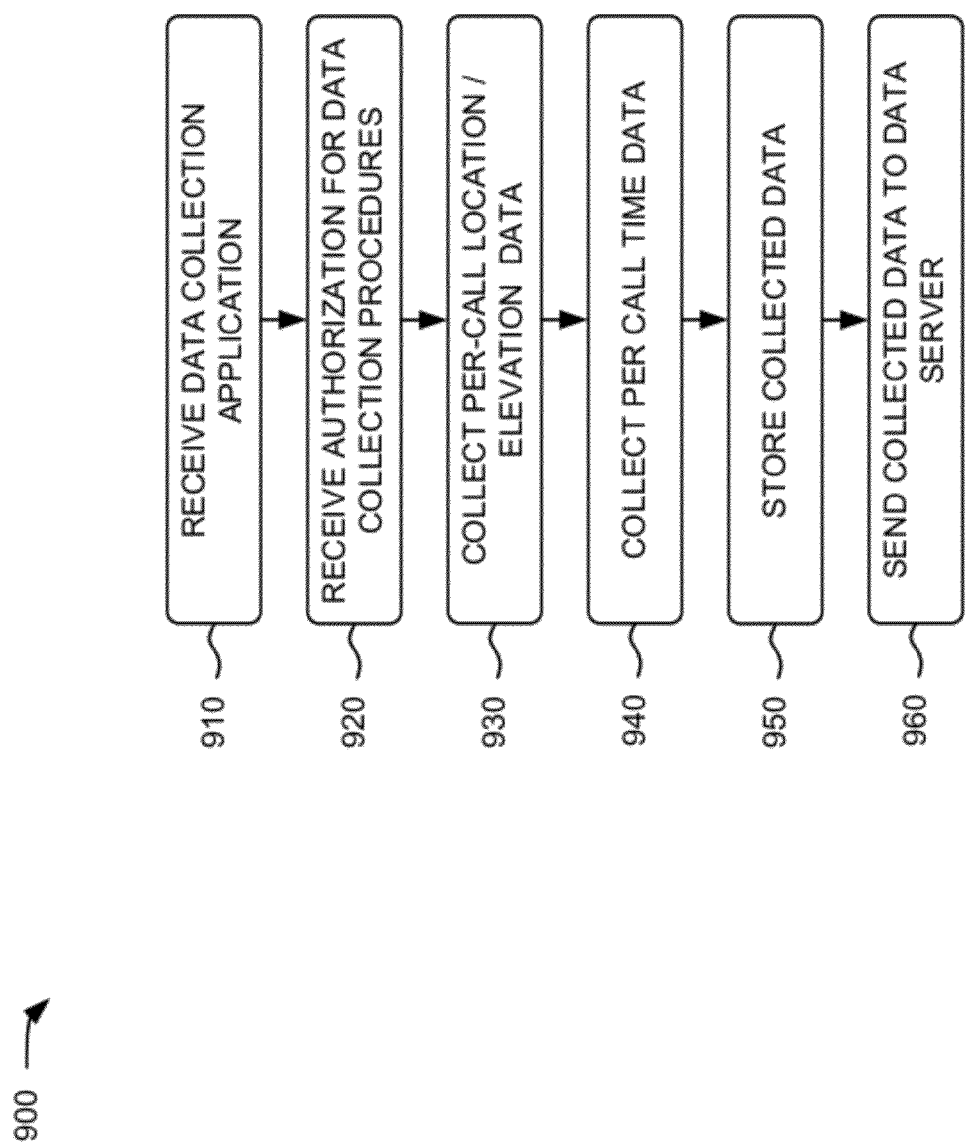
FIGS. 9-11 are flow charts of an example process for providing call location data according to an implementation described herein.
Figure 10:
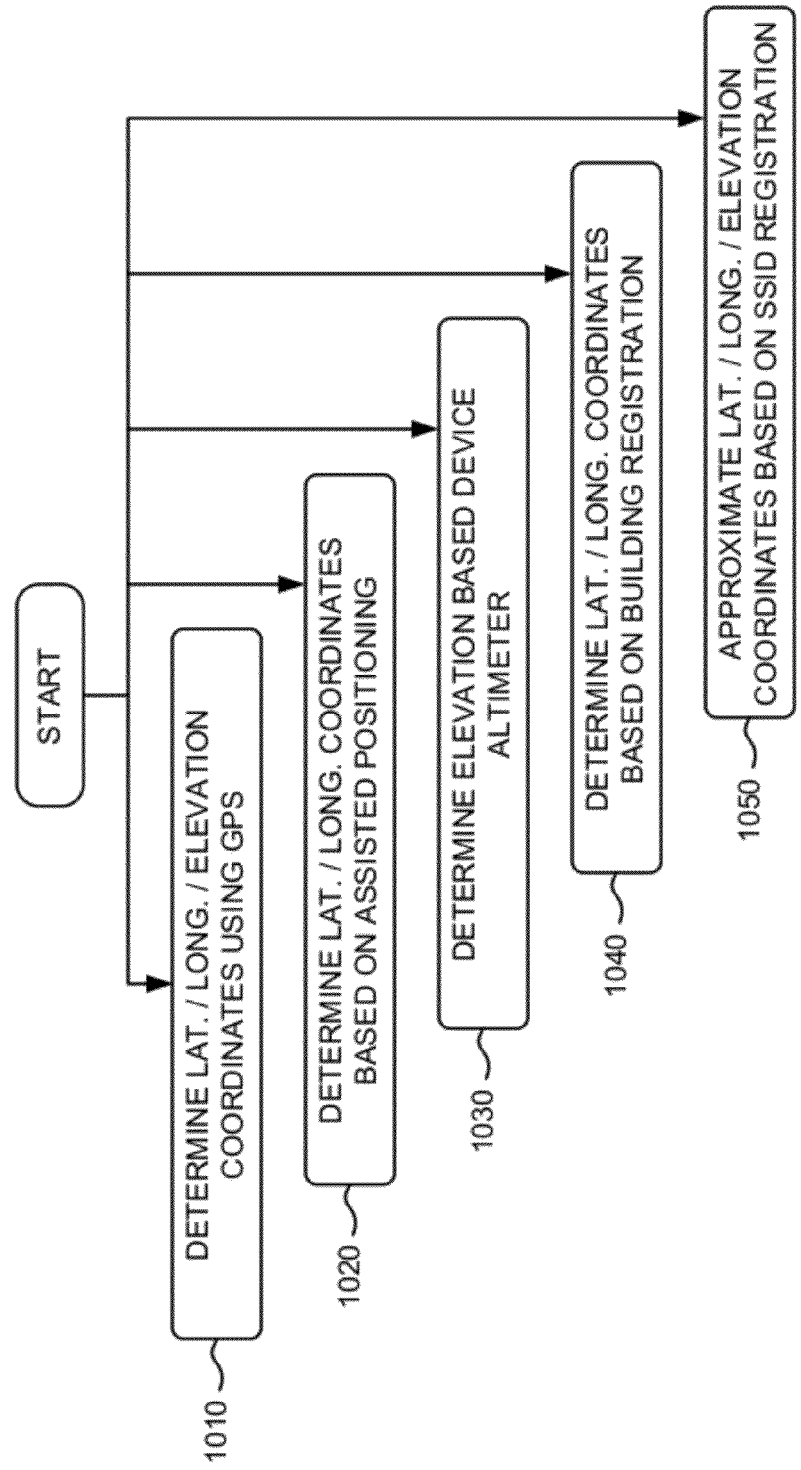
Figure 11:
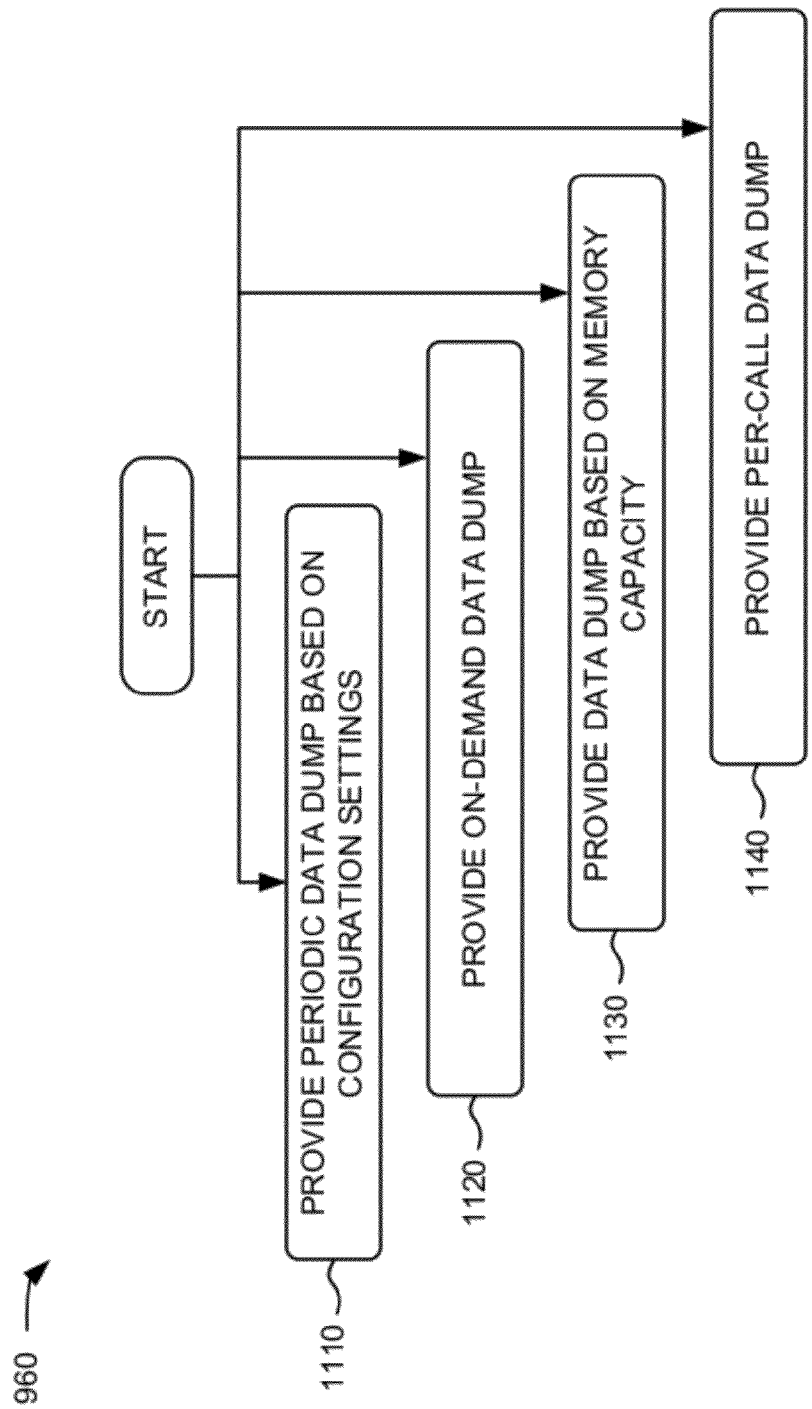

FIGS. 9-11 are flow charts of an example process 900 for providing call location data according to an implementation described herein. Process 900 may be performed by mobile device 210. In another implementation, some or all of process 900 may be performed by another device or group of devices, including or excluding mobile device 210.

As illustrated in FIG. 9, process 900 may include receiving a data collection application (block 910), and receiving authorization for data collection procedures (block 920). For example, in implementations described above in connection with FIG. 6, data collector client 600 and reporting client 610 may be included within a data collection application provided to mobile device 210 from data server 250. Data collector client 600 may collect location, elevation, and time data associated with calls made from mobile device 210. In one implementation, data collector client 600 may include an authorization interface to allow a user of mobile device 210 to expressly opt in to the location data collection service.

As further shown in FIG. 9, process 900 may include collecting per-call location and/or elevation data (block 930). For example, in implementations described above in connection with FIG. 6, mobile device 210 (e.g., data collector client 600) may track location, elevation, and time information related to each call initiated by mobile device 210. Location data collected by data collector client 600 may depend, in part, on the functions/capabilities supported by mobile device 210. In some implementations, location information may include, for example, GPS information or another form of GNSS information. Additionally, or alternatively, data collector client 600 may retrieve location information in the form of cellular tower triangulation information collected from mobile device 210. In still other implementations, data collector client 600 may obtain location information in the form of a fixed address or location associated with a wired network connection or IP address. In another implementation, data collector client 600 may extract elevation data from an altimeter included within mobile device 210. Elevation data may be combined, for example, with a physical address, GPS coordinates, or a building registration to provide three dimensional location data.

Returning to FIG. 9, process 900 may include collecting per-call time data (block 940), storing the collected data (block 950), and sending the collected data to a data server (block 960. For example, in implementations described above in connection with FIG. 6, mobile device 210 (e.g., data collector client 600) may include a time stamp with location information for each call of mobile device 210. Mobile device 210 (e.g., data collector client 600) may assemble the location, elevation, and/or time information associated with each call in a memory (e.g., memory 410) of mobile device 210, along with information from other calls, to provide to data server 250. Mobile device 210 (e.g., reporting client 610) may provide location tracking information from mobile device 210 to data server 250.

Process block 930 may include the process blocks depicted in FIG. 10. As shown in FIG. 10, process block 930 may include determining latitude, longitude, and/or elevation coordinates using GPS (block 1010), determining latitude and longitude coordinates based on assisted positioning (block 1020), and/or determining an elevation based on a device altimeter (block 1030). For example, in implementations described above in connection with FIG. 6, mobile device 210 (e.g., data collector client 600) may rely only on GPS satellite 290 to determine a location of mobile device 210. In another example implementation, PDE 270 may assist mobile device 210 in determining its GPS coordinates by providing ephemeris data to mobile device 210 to allow faster identification of satellites within view of the mobile device 210. Additionally, or alternatively, data collector client 600 may retrieve location information in the form of cellular tower triangulation information collected from mobile device 210. In another implementation, data collector client 600 may extract elevation data from an altimeter included within mobile device 210. Elevation data may be combined, for example, with a physical address, GPS coordinates, or a building registration to provide three dimensional location data.

Process block 930 may also include determining latitude and longitude coordinates based on a building registration (block 1040), and/or approximating latitude, longitude, and/or elevation coordinates based on a SSID registration (block 1050). For example, in implementations described above in connection with FIG. 6, mobile device 210 (e.g., data collector client 600) may obtain location information in the form of a fixed address or location associated with a wired network connection or IP address. Data collector client 600 may report, as location data, a SSID (e.g., associated with local wireless router 280) to which mobile device 210 may be connected. In another implementation, data collector client 600 may report multiple SSIDs (or other network identifiers) for multiple wireless (e.g., WiFi) networks within range of mobile device 210 at the time a call (e.g., using access network 235) is placed. In another implementation, data collector client 600 may register with a monitoring device when a user enters/exits a particular building.

Process block 960 may include the process blocks depicted in FIG. 11. As shown in FIG. 11, process block 960 may include providing a periodic data dump based on a configuration setting (block 1110), providing an on-demand data dump (block 1120), providing a data dump based on a memory capacity (block 1130), and/or providing a per-call data dump (block 1140). For example, in implementations described above in connection with FIG. 6, mobile device 210 (e.g., reporting client 610) may provide the location tracking information based on instructions from data collection manager 510. For example, reporting client 610 may be instructed to provide data dumps (e.g., of collected location tracking information) at configurable intervals (e.g., once a day, every few hours, during a particular time window, etc.), upon request from data server 250, whenever a certain data size or percentage of memory capacity (e.g., associated with mobile device 210) is reached, or after each call.

Figure 12:
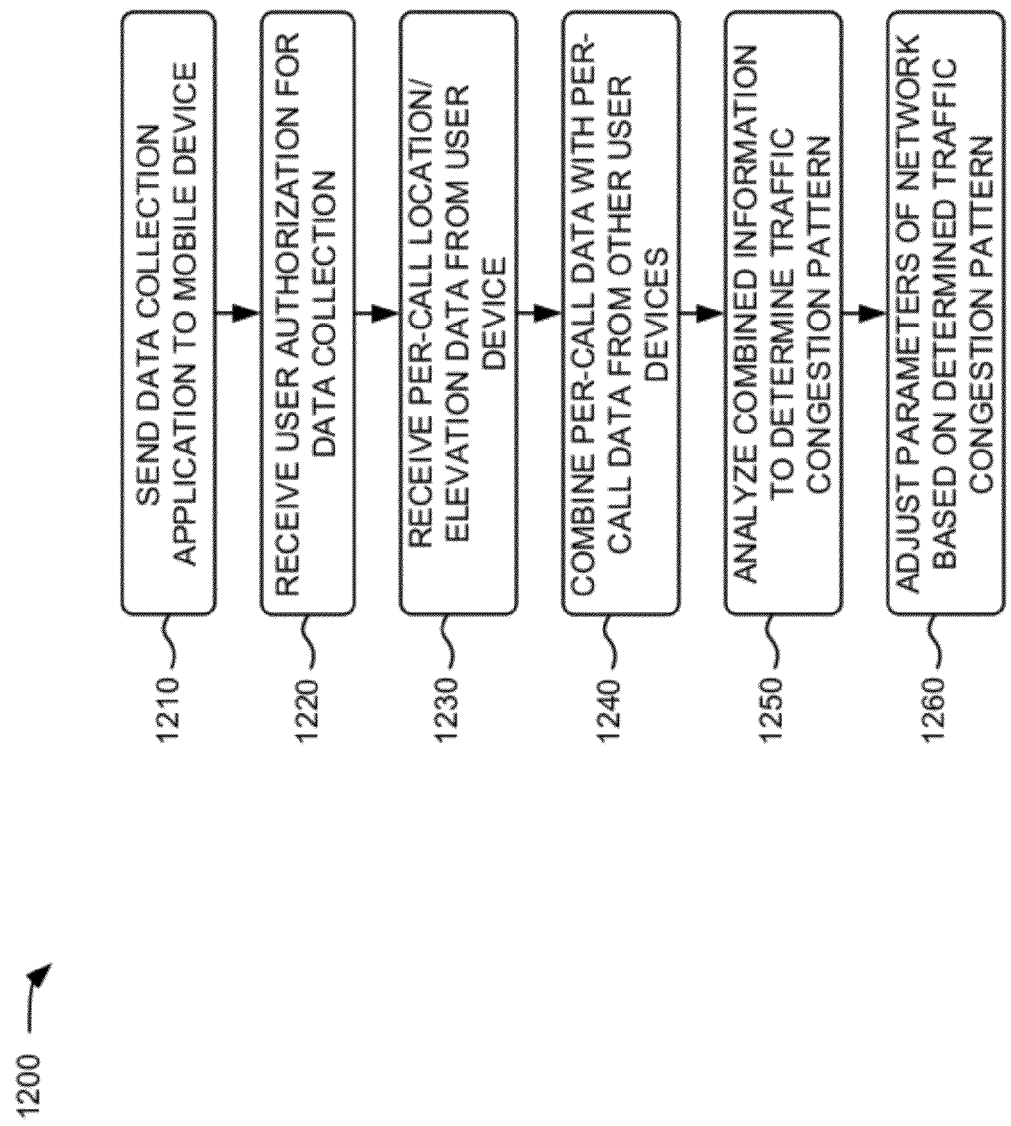
FIG. 12 is a flow chart of an example process for collecting call location data according to an implementation described herein.

FIG. 12 is a flow chart of an example process for collecting call location data according to an implementation described herein. Process 1200 may be performed by data server 250. In another implementation, some or all of process 1200 may be performed by another device or group of devices, including or excluding data server 250.

As illustrated in FIG. 12, process 1200 may include sending a data collection application to a mobile device (block 1210), and receiving user authorization for data collection (block 1220). For example, in implementations described above in connection with FIG. 5, data server 250 (e.g., registration module 500) may receive a request from mobile device 210 for a data collection application. In one implementation, the request for the data collection application may be in response to a targeted advertisement or other notification (e.g., including a link to data sever 250). In one implementation, registration module 500 may also include an authorization component to obtain a user's permission, verify a user's age (e.g., as not a minor), etc., before enabling the data collection application.

Process 1200 may include receiving per-call data from the mobile device (block 1230), combining the per-call data with per-call data from other mobile devices (block 1240), and analyzing the combined information to determine a traffic congestion pattern (block 1250). For example, in implementations described above in connection with FIG. 5, data server 250 (e.g., registration module 510) may direct mobile devices 210 to collect data at certain periods (e.g., only during peak periods, all periods, only when connected to a particular base station 230, etc.) and may provide instructions to mobile devices 210 to store and forward collected location data. Data server 250 (e.g., data collection manager 510) may receive the requested data from mobile devices 210. Data server 250 (e.g., data analyzer 520) may convert location data from mobile devices 210 into a common format. For example, GPS coordinates, physical addresses, and/or other location indicators may be converted into latitude and longitude coordinates with elevation. For example, data analyzer 520 may identify (or be provided with) a particular congested time associated with base station 230. Data analyzer 520 may plot location and elevation data for calls during that particular time to determine if a localized source of the congestion exists.

Process 1200 may include adjusting parameters of a network based on the determined traffic congestion pattern (block 1260). For example, wireless service providers may implement various solutions to mitigate localized congestion, as detected by data server 250. In one implementation, a service provider may install and/or selectively activate one or more microcells, picocells, or femtocells in the immediate vicinity of a localized source of congestion. For example, wireless core network 220 may automatically activate the microcell, picocell, or femtocell based on signals (e.g., indicating actual or impending congestion) from data server 250. The microcell, picocell, or femtocell may include a wired connection to the service provider's network to reduce traffic over access network 235. As another example, smaller service providers sharing base station 230 (e.g., leasing resources from a primary service provider) may be suspended during peak demand periods.

Figure 13:
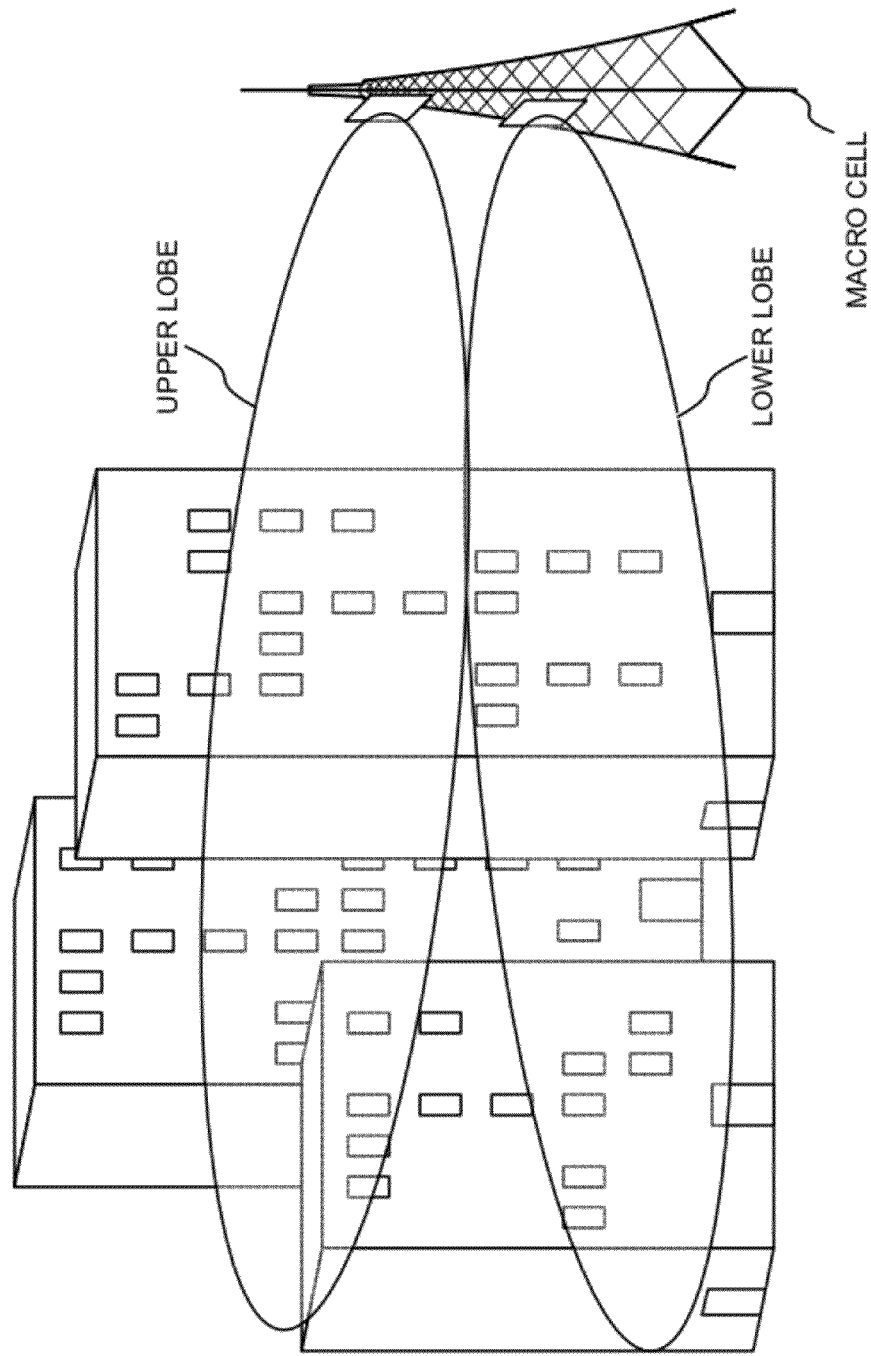
FIG. 13 is a diagram of an example macro cell employing a separate upper and lower lobe according to an implementation described herein.

As a further example of a mitigation option, service providers may implement a vertical split of the same frequency on base station 230 (e.g., using the same frequencies on two vertically separate lobes). For example, as shown in FIG. 13, a macro cell (e.g., generated by a base station) may use separate antennas to create an upper lobe and a lower lobe in areas of high network traffic in three-dimensional space.

Systems and/or methods described herein may send, to a mobile device, instructions to collect location-based data associated with calls conducted by the mobile device over a wireless access network. The systems and/or method may receive, from the mobile device, the location-based data which may include a three-dimensional location and a time associated with each of multiple calls conducted by the mobile device over the wireless access network. The systems and/or method may combine the location-based data with other location-based data from other mobile devices and may identify, based on the combined location-based data and other location-based data, a localized area of congestion for the wireless access network. The systems and/or methods may adjust one or more parameters of the wireless access network in order to minimize or eliminate the identified localized are of congestion.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, the method comprising:
   sending, by one of the computing devices and to a mobile device, instructions to collect location-based data associated with calls conducted by the mobile device over a wireless access network;
   receiving, by one of the computing devices and from the mobile device, the location-based data, where the location-based data includes a three-dimensional location and a time associated with each of multiple calls conducted by the mobile device over the wireless access network;
   combining, by one of the computing devices, the location-based data with other location-based data from other mobile devices;
   identifying a particular congested time associated with a particular cell of the wireless access network;
   plotting location and elevation data, from the combined location-based data and other location-based data, for calls during the particular congested time to determine a localized area of congestion at a particular elevation within the particular cell; and
   adjusting, by one of the computing devices, one or more parameters of the wireless access network in order to minimize or eliminate the localized area of congestion.

2. The method of claim 1, where the localized area of congestion is defined by an upper elevation and a lower elevation.

3. The method of claim 2, wherein the upper elevation and the lower elevation correspond to floors of a high-rise building.

4. The method of claim 1, where the location-based data includes one or more of:
   global positioning system (GPS) location coordinates,
   latitude and longitude coordinates,
   elevation coordinates,
   a service set identifier (SSID) associated with a physical location, or
   a physical address of a building where the mobile device is located.

5. The method of claim 4, further comprising:
   converting the location-based data into a common format.

6. The method of claim 1, further comprising:
   receiving, from a location registration station, a device count of a number of mobile devices within a building associated with the location registration station; and
   combining the device count from the location registration station with the location-based data and other location-based data.

7. The method of claim 6, wherein the location registration station includes one of:
   a femtocell,
   a picocell,
   a microcell, or
   a radio frequency identification (RFID) scanner.

8. The method of claim 1, wherein, when adjusting one or more parameters of the wireless access network, the processor is further to:
   use the same frequencies on two vertically separate lobes from antennas of a base station for the particular cell.

9. The method of claim 1, further comprising:
   receiving, from the mobile device, authorization to collect the location-based data.

10. The method of claim 1, wherein the location-based data includes:
    location and elevation coordinates based on a physical location associated with a wireless local area network that is detected by the mobile device.

11. The method of claim 10, where the location and elevation coordinates based on a physical location associated with a wireless local area network includes triangulation data from multiple service set identifiers (SSIDs) detected by the mobile device.

12. The method of claim 1, wherein receiving the location-based data includes one or more of:
    receiving the location-based data based on a configurable periodic setting;
    receiving the location-based data in response to a request from one of the computing devices; or
    receiving the location-based data when a memory capacity threshold of the mobile device is reached.

13. The device of claim 1, wherein the mobile device includes one or more of:
    a radiotelephone,
    a personal communications system (PCS) terminal,
    a personal digital assistant (PDA),
    a wireless device,
    a smart phone,
    a laptop computer, or
    a global positioning system (GPS) device.

14. A computing device, comprising:
    a memory to store a plurality of instructions; and
    a processor to execute instructions in the memory to:
      send, to a mobile device, instructions to collect location-based data associated with calls conducted by the mobile device over a wireless access network;
      receive, from the mobile device, the location-based data, where the location-based data includes a three-dimensional location and a time associated with each of multiple calls conducted by the mobile device over the wireless access network;
      combine the location-based data with other location-based data from other mobile devices;
      identify a particular congested time associated with a particular cell of the wireless access network;

plot location and elevation data, from the combined location-based data and other location-based data, for calls during the particular congested time to determine a localized area of congestion at a particular elevation within the particular cell; and adjust one or more parameters of the wireless access network in order to mitigate the localized area of congestion.

15. The computing device of claim 14, where the location-based data includes one or more of:
   global positioning system (GPS) location coordinates,
   latitude and longitude coordinates,
   elevation coordinates,
   a service set identifier (SSID) associated with a physical location, or
   a physical address of a building where the mobile device is located.

16. The computing device of claim 14, where the instructions to collect location-based data include instructions to send the location-based data to the computing device based on or more of:
   a configurable periodic setting,
   a request from the data server, or
   a memory capacity threshold of the mobile device.

17. The computing device of claim 14, wherein the processor is further to:
   receive, from a location registration station, a device count of a number of mobile devices within a building associated with the location registration station; and
   combine the device count from the location registration station with the location-based data and other location-based data.

18. The computing device of claim 14, when wherein adjusting one or more parameters of the wireless access network in order to minimize or eliminate the localized area of congestion, the processor is further to:
   use the same frequencies on two vertically separate lobes from antennas of a base station for the particular cell.

19. The computing device of claim 14, wherein, when receiving the location-based data, the processor is further to execute instructions in the memory to one or more of:
   receive the location-based data based on a configurable periodic setting;
   receive the location-based data in response to a request from the computing device; or
   receive the location-based data when a memory capacity threshold of the mobile device is reached.

* * * * *